(12) United States Patent  (10) Patent No.: US 8,565,995 B2
Kueperkoch et al.  (45) Date of Patent: Oct. 22, 2013

(54) METHOD FOR DETECTING WHEEL SLIP

(75) Inventors: Stefan Kueperkoch, Heilbronn (DE);
Frank Leibeling, Moeglingen (DE);
Jasper-Jeen Jeninga, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 508 days.

(21) Appl. No.: 12/734,417

(22) PCT Filed: Oct. 2, 2008

(86) PCT No.: PCT/EP2008/063203
§ 371 (c)(1),
(2), (4) Date: Aug. 25, 2010

(87) PCT Pub. No.: WO2009/059853
PCT Pub. Date: May 14, 2009

(65) Prior Publication Data
US 2010/0312448 A1  Dec. 9, 2010

(30) Foreign Application Priority Data
Nov. 6, 2007 (DE) .......................... 10 2007 052 749

(51) Int. Cl.
*B60T 7/12* (2006.01)
*B60K 28/16* (2006.01)
(52) U.S. Cl.
USPC ............................... 701/82; 701/84; 180/197
(58) Field of Classification Search
USPC ................ 701/41, 47, 46, 71, 72, 74, 78–93;
180/197, 38, 206.2, 9.38
See application file for complete search history.

(56) References Cited

U.S. PATENT DOCUMENTS

| 4,548,079 | A | * | 10/1985 | Klatt | 73/865 |
| 5,735,585 | A | * | 4/1998 | Koike et al. | 303/145 |
| 6,615,126 | B1 | * | 9/2003 | Potter et al. | 701/84 |
| 2006/0149424 | A1 | * | 7/2006 | Hecker et al. | 701/1 |

FOREIGN PATENT DOCUMENTS

| DE | 197 28 769 | 1/1999 |
| EP | 0 443 785 | 8/1991 |
| EP | 0 932 033 | 7/1999 |
| WO | WO 2004/074057 | 9/2004 |

* cited by examiner

*Primary Examiner* — Muhammad Shafi
(74) *Attorney, Agent, or Firm* — Kenyon & Kenyon LLP

(57) ABSTRACT

In a method for detecting wheel slip at at least one wheel which is driven by an engine, the drive torque acting upon the wheel is varied, and the reaction of the wheel to the change in the drive torque is measured and evaluated.

15 Claims, 2 Drawing Sheets

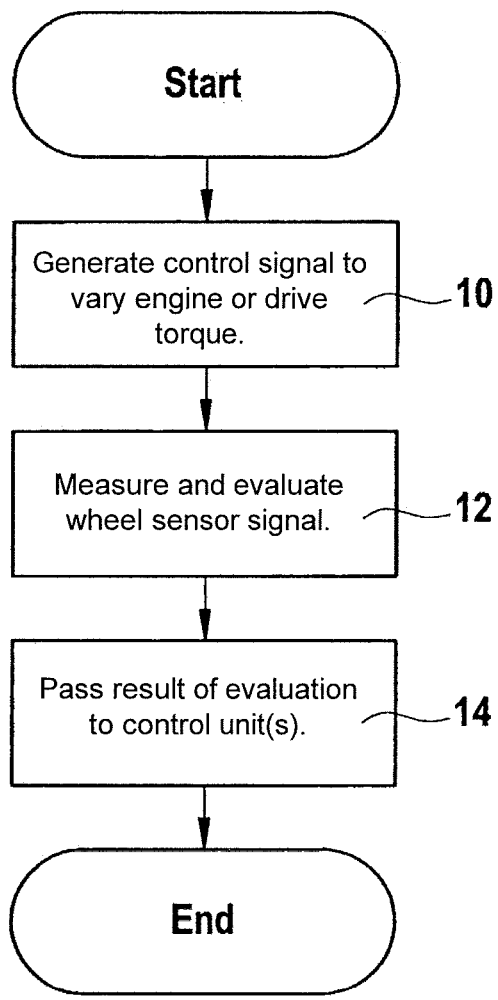

METHOD FOR DETECTING WHEEL SLIP

BACKGROUND OF THE INVENTION

1. Field of the Invention

The present invention relates to a method for detecting wheel slip and a corresponding control unit for executing the method.

2. Description of Related Art

The vehicle speed of passenger cars is usually estimated, these days, from wheel rotational frequencies. When this method is used, inaccuracies may appear if a large wheel slip occurs in response to accelerating or braking, that is, when certain wheels turn faster or slower than the actual vehicle speed. In this case, the vehicle speed is estimated either too high or too low.

Control units such as ABS, TCS and ESP utilize the estimated speed for monitoring the state of the vehicle, or for calculating setpoint values, such as for calculating a setpoint yaw rate. An inaccurate determination of the vehicle speed may therefore lead to the control units reacting faultily and braking the vehicle too little or too much.

BRIEF SUMMARY OF THE INVENTION

It is an object of the present invention to provide an improved possibility for detecting wheel slip and the stability of a wheel.

One essential aspect of the present invention is to vary the drive torque at at least one wheel, and to measure and evaluate the reaction of the wheel to the change in the drive torque. When there is a large wheel slip, the wheel speed will change relatively fast, since essentially only the affected wheel is accelerated or decelerated by the drive torque. The speed of the vehicle does not change in this context, or changes only scarcely. By contrast, if no wheel slip or only a little is present, the wheel acceleration is substantially less, since not only the respective wheel, but the entire vehicle is accelerated or decelerated. Consequently, one may conclude whether the wheel is running stably or unstably from the reaction of the wheel.

To determine the reaction of the wheel, one may, for instance, evaluate the wheel's rotational frequency, its change, the wheel speed, its change, the wheel's acceleration or its change, or another characteristic variable for the behavior of the wheel. Alternatively, one could also evaluate the change in the wheel's rotational torque. For the sake of simplicity, reference is made only to the change in the wheel speed, in the following text. The other variables could equally be drawn upon for the evaluation, however.

The method according to the present invention finds use preferably in 4×4 vehicles.

Wheel instability is detected when the change in the wheel speed (or another characteristic variable) in reaction to the change in the drive torque exceeds a specified threshold value. The threshold value is preferably at about a 10% deviation from the value which would be present without an artificial change in the drive torque, in a non-slipping (stable) wheel. The corresponding values in response to stable travel behavior may be stored as characteristics curves in a memory, for example.

The change in the wheel speed or the wheel acceleration is preferably measured using wheel speed sensors.

According to one example embodiment of the present invention, the drive torque may also be increased and decreased again, once or a plurality of times in succession. In the extreme case, the drive torque may be varied, for instance, periodically oscillating. Depending on whether the wheel is in a slip condition or not, it will follow excitation either in a brief period of time and at high amplitude, or greatly decelerated, at low amplitude. Consequently, from the reaction of the wheel one may in turn ascertain the stability of the wheel.

In the case of oscillating excitation, one may preferably detect the presence of a wheel instability if the change in the wheel speed or the frequency exceeds a specified threshold value at least once. It may also be established that the observed variable has to exceed associated threshold values a plurality of times. When the drive torque is increased, it may be established, for instance, that, in the acceleration phase, a certain acceleration value has to be exceeded, and in the deceleration of the drive torque a certain deceleration value has to be exceeded.

The drive torque is preferably varied using an engine control unit which emits an engine control signal to the engine of the vehicle.

The wheel slip may also be determined quantitatively within a certain scope, by forming a relationship of the excitation (change in the drive torque) and the reaction of the wheel.

The method described above is preferably controlled by software. A corresponding algorithm may be stored in the engine control unit, for example.

According to one example embodiment of the present invention, in the case where there is no wheel slip, or rather the wheel is running in stable fashion, the vehicle mass may be calculated from the change in the drive torque, or rather the force $\Delta F$ acting on the wheel and the change in vehicle acceleration $\Delta a$. the torque acting on the wheel should be held constant for a certain period, in this context, in order to achieve a stable acceleration. For vehicle mass $m_F$ the following applies:

$$m_F = \frac{\Delta F}{\Delta a}$$

This approach may also be used independently of the wheel slip detection.

BRIEF DESCRIPTION OF THE SEVERAL VIEWS OF THE DRAWING

FIG. 2 shows a flow chart of an exemplary embodiment of a method according to the present invention.

DETAILED DESCRIPTION OF THE INVENTION

Figure 1:
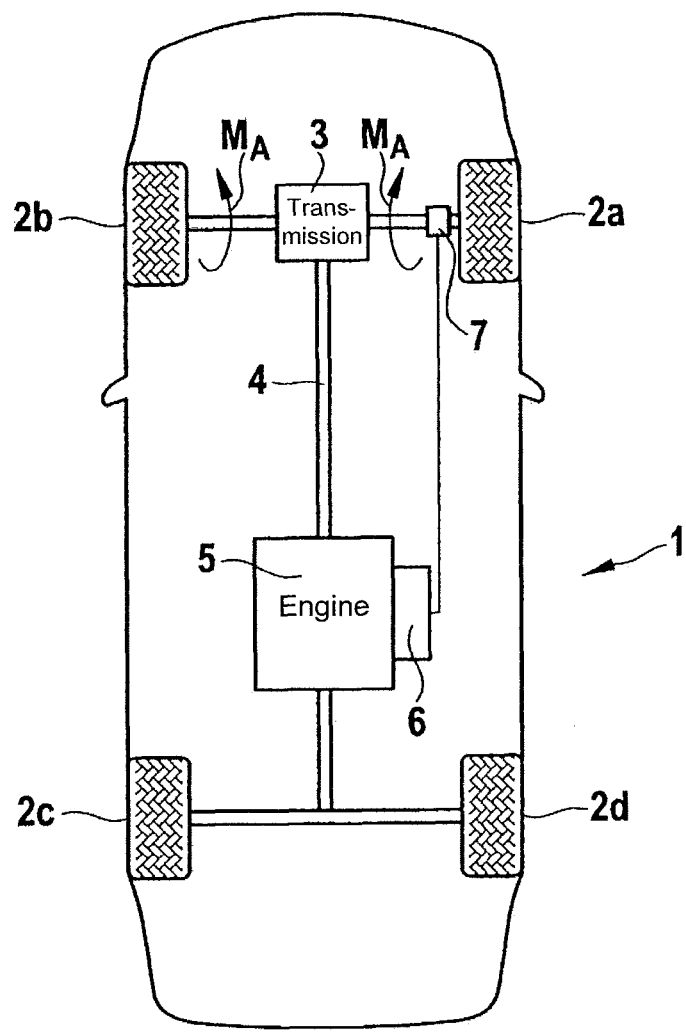
FIG. 1 shows a schematic illustration of a motor vehicle in which the wheels are driven by an engine via a transmission.

FIG. 1 shows a schematic representation of a vehicle 1 having four wheels 2a, 2b, 2c and 2d. Front wheels 2a and 2b are driven by an engine 5 via power train 4 and a transmission 3. The drive torque acting on wheels 2a and 2b is designated as $M_A$. Engine 5 is connected to an engine control unit 6.

A rotational speed sensor 7 is situated on wheel 2a, and from its signal one is able to ascertain the wheel speed or the wheel acceleration, for example.

In order to detect a large wheel slip or a wheel instability (i.e. the wheel slip is greater than at the maximum of the μ-slip curve), an algorithm is stored in control unit 6, which works essentially as shown in FIG. 2:

In a first step 10, engine control unit 6 generates a control signal for engine 5, using which, engine torque or drive torque $M_A$ is automatically increased or decreased. In block 12, the signal of rotational speed sensor 7 is scanned and evaluated by engine control unit 6.

In the present exemplary embodiment, the presence of a large wheel slip is detected if the change in the wheel speed as a result of the change in the drive torque exceeds a specified threshold value. When there is an unstable wheel, the wheel speed will change relatively fast, since essentially only the affected wheel is accelerated or decelerated by the drive torque. By contrast, if no, or little, wheel slip is occurring (i.e. the wheel slip is less than at the maximum of the μ-slip curve), the resulting wheel acceleration or wheel deceleration is substantially less, since not only the wheel involved, but the entire vehicle has to be accelerated or decelerated. Consequently, one may conclude whether the wheel is running stably or unstably from the reaction of the wheel. Instead of the wheel speed, one could alternatively draw upon the wheel's rotational speed, the wheel acceleration or another variable characterizing the wheel behavior for the threshold value comparison.

The threshold value is preferably at about a 10% deviation from the value which would be present without an artificial change in the drive torque, in a non-slipping (or slightly slipping) wheel.

According to one example embodiment of the present invention, the method of steps 10 and 12 may be refined by successively increasing and decreasing the drive torque a plurality of times. In the extreme case, wheel 2*a* may be excited in oscillating fashion. If wheel 2*a* is unstable, it will follow the oscillation of the engine torque in current fashion at high amplitude. If, on the other hand, the wheel is running with little slip, it will follow only with very low amplitude, since in this case the inertia of the entire vehicle acts against the excitation. In this case, the presence of wheel instability is detected if the change in the wheel speed or the oscillating frequency of the wheel exceeds a specified threshold value at least once.

Finally, in step 14, the result of ascertaining the slip is passed on to other control units, so that other control algorithms or regulating algorithms, which process the vehicle speed, are able to react correspondingly.

What is claimed is:

1. A method for detecting wheel slip at a wheel driven by an engine, the method comprising:
   generating a control signal, by an engine control unit, to oscillate a drive torque acting on the wheel;
   measuring, by a wheel sensor, an operational characteristic of the wheel in response to the oscillating drive torque; and
   evaluating, by the engine control unit, the reaction of the wheel to the oscillating drive torque to detect a wheel slip condition based on a comparison of the measured operational characteristic to a threshold value.

2. The method as recited in claim 1, wherein the operational characteristic includes one of wheel rotational speed, change in wheel rotational speed, wheel speed, change in wheel speed, wheel acceleration, or change in wheel acceleration.

3. The method as recited in claim 2, wherein the wheel slip is detected if the measured operational characteristic exceeds the threshold value, and the threshold value is specified as a predetermined percentage deviation from the value which would be present without the change in the drive torque caused by the oscillating of the drive torque.

4. The method as recited in claim 2, wherein the wheel speed or the wheel acceleration is ascertained from a wheel rotational speed measured using a wheel rotational speed sensor.

5. The method as recited in claim 2, wherein the oscillation of the drive torque is initiated using the engine control unit to emit the engine control signal to the engine.

6. The method as recited in claim 2, wherein the wheel slip is determined quantitatively from the relationship between the change in the drive torque and the change in the wheel acceleration.

7. The method as recited in claim 1, further comprising storing the threshold value in the form of a characteristic curve in a memory.

8. A control unit having a non-transitory storage medium including program instructions, which when executed perform a method for detecting wheel slip at a wheel driven by an engine, the method comprising:
   generating a control signal to oscillate a drive torque acting on the wheel;
   receiving a measurement of an operational characteristic of the wheel in response to the oscillating drive torque; and
   evaluating the reaction of the wheel to the oscillating drive torque to detect a wheel slip condition based on a comparison of the measured operational characteristic to a threshold value.

9. The control unit as recited in claim 8, wherein the operating characteristic includes one of wheel rotational speed, change in wheel rotational speed, wheel speed, change in wheel speed, wheel acceleration, or change in wheel acceleration.

10. The control unit as recited in claim 9, wherein the wheel slip is detected based on the measured operational characteristic exceeding the threshold value, and the threshold value is specified as a predetermined percentage deviation from the value which would be present without the change in the drive torque caused by the oscillating of the drive torque.

11. The control unit as recited in claim 9, wherein the wheel speed or the wheel acceleration is ascertained from a wheel rotational speed measured using a wheel rotational speed sensor.

12. The control unit as recited in claim 9, wherein the wheel slip is determined quantitatively from the relationship between the change in the drive torque and the change in the wheel acceleration.

13. The control unit as recited in claim 8, wherein the method further comprises storing the threshold value in the form of a characteristic curve in a memory.

14. A method for determining the mass of a vehicle, comprising:
   generating a control signal, by an engine control unit, to automatically vary the drive torque acting on a wheel driven by an engine of the vehicle;
   measuring, by a wheel sensor, a change in the wheel acceleration of the wheel;
   determining whether a wheel slip condition exists at the wheel; and
   if no wheel slip conditions exists at the wheel, determining, by the engine control unit, the vehicle mass based on the relationship between the change in the wheel acceleration and one of the change in the drive torque or a variable proportional to the change in the drive torque.

15. The method as recited in claim 14, wherein the vehicle mass is determined by the formula $$m_F = \frac{\Delta F}{\Delta a}$$

where $\Delta F$ corresponds to the change in the drive torque ($M_A$), $\Delta a$ is the change in the acceleration of the vehicle and $m_F$ is the vehicle mass.

\* \* \* \* \*

UNITED STATES PATENT AND TRADEMARK OFFICE
CERTIFICATE OF CORRECTION

PATENT NO. : 8,565,995 B2  Page 1 of 1
APPLICATION NO. : 12/734417
DATED : October 22, 2013
INVENTOR(S) : Kueperkoch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 571 days.

Signed and Sealed this

Fifteenth Day of September, 2015

Michelle K. Lee
*Director of the United States Patent and Trademark Office*